United States Patent
Thompson et al.

(10) Patent No.: US 8,960,548 B2
(45) Date of Patent: Feb. 24, 2015

(54) BIOPTIC DATA READER WITH SPLIT VERTICAL WINDOWS AND SPEAKER

(71) Applicant: Datalogic ADC, Inc., Eugene, OR (US)

(72) Inventors: Ryan B. Thompson, Eugene, OR (US); Alan Shearin, Eugene, OR (US); Alexander M. McQueen, Eugene, OR (US); David Newman, Eugene, OR (US); Brett T. Howard, Eugene, OR (US); James E. Swirczynski, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 13/912,115

(22) Filed: Jun. 6, 2013

(65) Prior Publication Data
US 2013/0327830 A1 Dec. 12, 2013

Related U.S. Application Data (60) Provisional application No. 61/657,705, filed on Jun. 8, 2012.

(51) Int. Cl.
G06K 7/14 (2006.01)
G06K 7/01 (2006.01)
G06K 7/10 (2006.01)

(52) U.S. Cl.
CPC ............... G06K 7/01 (2013.01); G06K 7/1096 (2013.01)
USPC ........................................................ 235/454

(58) Field of Classification Search
USPC .................. 235/379, 454, 462.14, 462.43
See application file for complete search history.

(56) References Cited

U.S. PATENT DOCUMENTS

| 4,959,017 | A | * | 9/1990 | Thompson et al. ............ 434/110 |
| 5,594,228 | A | | 1/1997 | Swartz et al. |
| 6,062,478 | A | | 5/2000 | Izaguirre et al. |
| 6,332,575 | B1 | | 12/2001 | Dickover et al. |
| 6,631,844 | B1 | | 10/2003 | Ohkawa et al. |
| 6,669,092 | B2 | | 12/2003 | Leanheart et al. |
| 6,719,202 | B1 | | 4/2004 | Kawai et al. |

(Continued)

FOREIGN PATENT DOCUMENTS

| JP | 2000-348040 A | 12/2000 |
| JP | 3791493 B2 | 6/2006 |

OTHER PUBLICATIONS

Korean Intellectual Property Office, International Search Report and Written Opinion, International Patent Application No. PCT/US2013/044759, dated Sep. 27, 2013, 11 pages.

*Primary Examiner* — Jamara Franklin
(74) *Attorney, Agent, or Firm* — Stoel Rives LLP (57) ABSTRACT

A data reading system including a lower base section with a generally horizontal surface and a vertical section extending perpendicularly from the lower housing section. The vertical section includes a front face with a first scan window through which a data reader is operable to read encoded data on an item. The data reading system further includes a speaker system having a speaker grille laterally spaced apart from the first scan window on the front face of the vertical section. The speaker system may emit a sound or other message to confirm that the encoded data was (or was not) properly captured by the data reader. The data reading system may further include a second scan window on the front face of the vertical section. In such instances, the speaker grille may be positioned between the scan windows on the front face of the vertical section.

18 Claims, 8 Drawing Sheets

(56) References Cited

U.S. PATENT DOCUMENTS

| | | |
|---|---|---|
| 7,088,859 B1 | 8/2006 | Yamaguchi et al. |
| 7,491,905 B2 | 2/2009 | Jwo |
| 7,672,871 B2 | 3/2010 | Brenhouse |
| 2007/0290043 A1* | 12/2007 | Russell et al. ........... 235/462.14 |
| 2008/0011856 A1 | 1/2008 | Bremer et al. |
| 2010/0019040 A1 | 1/2010 | Haber et al. |
| 2010/0139989 A1 | 6/2010 | Atwater et al. |
| 2010/0191603 A1 | 7/2010 | Herwig |

* cited by examiner

BIOPTIC DATA READER WITH SPLIT VERTICAL WINDOWS AND SPEAKER

RELATED APPLICATION DATA

This application is a nonprovisional of and claims the benefit under 35 U.S.C. §119(e) from U.S. Provisional Patent Application No. 61/657,705, filed Jun. 8, 2012, the disclosure of which is incorporated by reference herein in its entirety.

BACKGROUND

The field of this disclosure relates generally to systems and methods for data reading and/or image capture, and more particularly, to such systems incorporating a speaker for sound transmission.

Data reading systems are used in a variety of settings for reading optical codes, acquiring data, and/or capturing images. For instance, in retail stores, data reading devices are well known for reading UPC and other types of optical codes on grocery items or packages. One common data reader used in such systems is an imager-based reader that employs an imaging device or sensor array, such as a CCD (charge coupled device) or CMOS (complementary metal oxide semiconductor) device. An imager-based reader uses an imager or camera to generate electronic image data, typically in digital form, of an optical code. The image data is then processed to decode the optical code. Imager-based readers can be configured to read a variety of optical codes, such as 1-D and 2-D optical codes, as well as other types of optical codes or bar code symbologies.

In some designs, data reading systems incorporate a speaker into the housing or other support structure to communicate information to a customer or clerk (also referred to as a user). However, in many such systems, positioning of the speaker is not considered critically and instead tends to be an afterthought. Thus, the speaker often is placed in a sub-optimal location such as on the side of the data reader housing.

The present inventors have recognized some disadvantages of such arrangements for the speaker. For instance, one such disadvantage is that the surfaces of these data reading systems without data-reading components (e.g., the bottom and side surfaces of the housing) are typically embedded in a countertop or other structure such that the speaker is partially or fully covered, or otherwise directed away from the user. Consequently, the sound produced by the speaker is muffled and not clearly audible, and the user may have difficulty hearing the sound emitted by the speaker. In addition, for data reading systems used in retail establishments, the area near the checkout counters tends to be rather noisy, which exacerbates any problems related to reduced sound volume or quality.

The present inventors have also recognized that many data reading systems provide limited or small sound chambers for the speakers, thereby limiting sound volume or requiring additional input power or larger speaker sizes to amplify sound. The present inventors have, therefore, determined that it would be desirable to provide a scanner or data reading system with a speaker configuration and design for improved acoustics.

Additional aspects and advantages will be apparent from the following detailed description of preferred embodiments, which proceeds with reference to the accompanying drawings.

DETAILED DESCRIPTION OF EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Various imager-based data readers and associated methods are described herein. Some embodiments of such systems may improve or enhance the reading performance of the data readers by providing various image fields or fields-of-view to capture multiple views of a target region. In some embodiments, an image field or field-of-view may be partitioned into two or more individual regions, each of which may be used to capture a separate view of the view volume. In addition to providing more views than imagers, such embodiments with split fields-of-view may enhance the effective view volume beyond the view volume available to a single imager with a single field-of-view. In the following description of the figures and any example embodiments, any description relating to an image field or a field-of-view of a particular imager should be understood as including embodiments where the field-of-view is partitioned or split into two or more regions.

Figure 1:
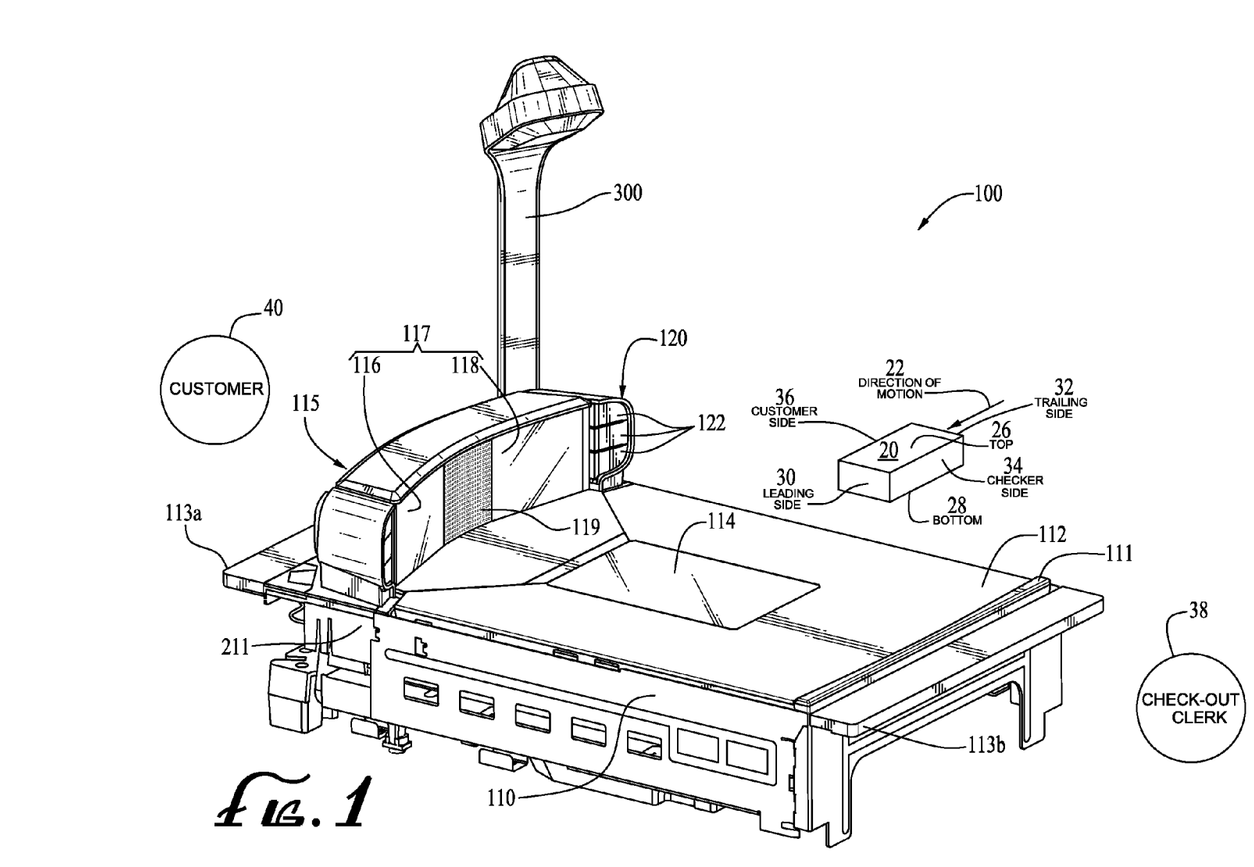
FIG. 1 is a perspective view of a data reader illustrating an exemplary six-sided box-shaped object that may be passed through a view volume of the data reader.

FIG. 1 illustrates a data reading system 100 and an exemplary item 20 (e.g., a grocery item) that may be passed through a view volume of the data reading system 100. The data reading system 100 is illustrated as a two-plane or bioptic reader having a generally horizontal window 114 and a generally vertical split window 117. The view volume may be a function of the enclosure and style of the data reading system 100 and the perspectives of the views in which images of the item 20 are captured. For clarity purposes, a perspective may encompass a location, direction, angle, or any combination of the foregoing, that characterizes a point-of-view for seeing, imaging, visualizing via machine vision, or illuminating a part or whole of the item 20. Single or multiple views may be obtained through each window 114, 117 depending on the design of the reader 100. The collection of all views together constitutes a cumulative view, which defines the viewing volume or scan volume of the reader 20. Different views may enable reading of an optical code on different sides of the item 20.

For general purposes of discussion, the item 20 is represented as a six-sided, box-shaped package having a top surface 26, a bottom surface 28, a leading side 30, a trailing side 32, a checker side 34, and a customer side 36. In some instances, the item 20 may be described with respect to its direction of motion 22 across a generally horizontal window 114 of a cover or platter 112. In addition, any description regarding the position of a checkout clerk 38 and a customer 40 is meant to facilitate description and establish a frame of reference related to a typical position of the checkout clerk 38 and the customer 40, as illustrated in FIG. 1, and is not intended to be limiting. It should be understood that the data reading system 100 may be used without a checkout clerk 38, and/or the customer 40 (or clerk 38) may be positioned at any side of the data reading system 100. In addition, the item 20 is described as a box-shaped package for convenience, but it should be understood that the item 20 may encompass other shapes, including, for example, round fruits or vegetables, cylindrical cans, irregularly shaped packages, such as a bag of potatoes, potato chips, or the like.

With general reference to FIGS. 1-4, the following section briefly describes general components of the data reading system 100 and provides an example operation of the data reading system 100. As mentioned previously, the data reading system 100 may be a two-plane or bioptic reader having a lower base section 110, a platter 112, and a raised upper section 115 extending from and protruding upwardly from the platter 112 (and the lower base section 110). One or more data readers (not shown) are housed within lower base section 110 and project one or more fields-of-view through the respective windows 114, 117 to attempt to capture an optical code on the item 20. The components of the data reading system 100 (e.g., the lower base section 110 and the platter 112) may be directly or indirectly coupled to a common base or chassis 211.

In some embodiments, the data reading system 100 may include a post-mounted, top-down data reader 300 for reading a top surface 26 of the item 20. The top-down data reader 300 may be mounted to the lower base section 110 via an opening 302 near an end 113a (see FIG. 2). Further details and example embodiments of such a data reading system are described in U.S. App. No. 61/657,634, filed Jun. 8, 2012, the disclosure of which is hereby incorporated by reference.

In an example operation, the item 20 is moved across the platter 112 and above the window 114. If the optical code is on the customer side 36 surface of the item 20, the imaging camera system reading through the split windows 116, 118 of the vertical upper section 115a captures the optical code (for a taller item 20, the top-down data reader 300 may also capture the code). Similarly, if the optical code is on the bottom surface 28 or on the top surface 26, the bottom data reader or the top-down data reader, respectively, may capture the optical code. If the optical code is positively captured, the speaker 119a (see FIG. 3) may emit a beeping (or other) sound indicating that the optical code was properly read. Alternatively, the speaker 119a may emit a different beeping (or other) sound indicating that the optical code was not properly read and may also emit a message requesting that the user reprocess the item 20.

The following describes further detailed aspects of this and other embodiments of the data reading system 100. It should be understood that certain embodiments of the data reading system 100 may be illustrated or described herein in the context of use in retail establishments or other similar environments. It should be understood that such use in a retail establishment is merely one example use for such a system and should not be considered as limiting. Other uses for data readers with the characteristics and features described herein may be possible, for example, use in an industrial location such as a parcel distribution (e.g., postal) station. In addition, while the terms speaker and speaker grille as used herein typically refer to distinct structures of a speaker system, the terms may be used interchangeably to refer to a general speaker system comprising a speaker and a speaker grille.

Figure 2:
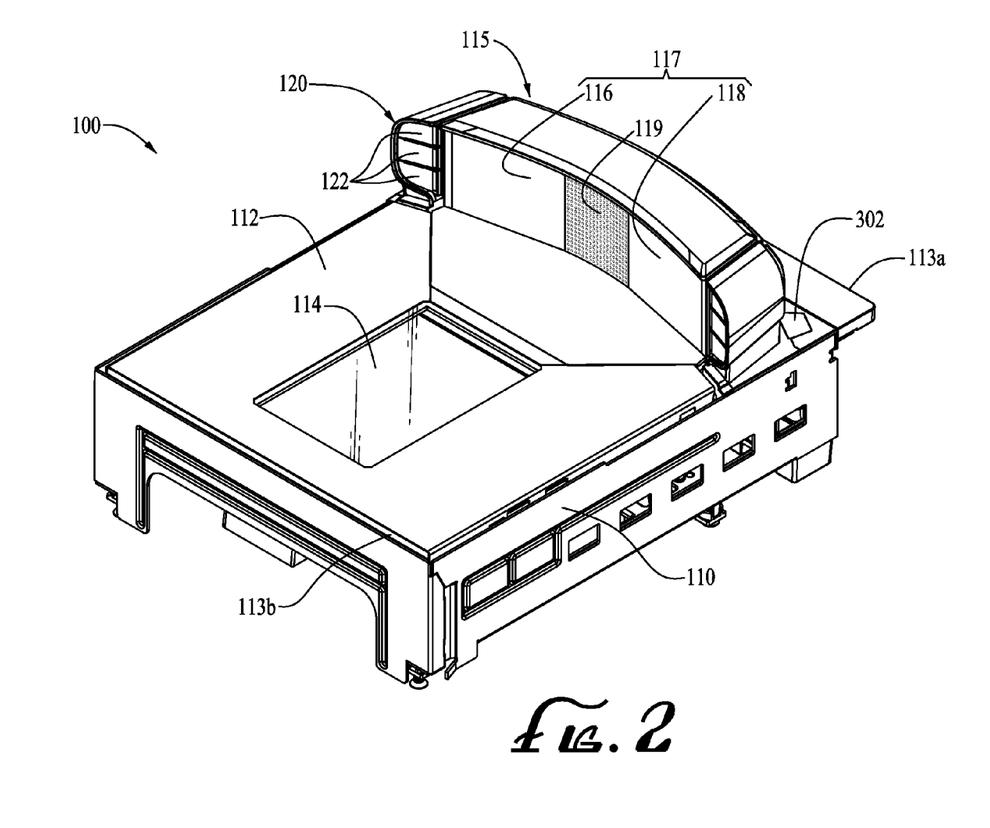
FIG. 2 is an isometric view of a data reader similar to FIG. 1 with a shorter platter section and with the top-down data reader removed.

For clarity purposes, the following description may provide examples or ranges for length and width dimensions of various components of the data reading system 100. It should be understood that the length and width dimensions of the data reading system 100 may vary in accordance with a number of factors, such as the available space and configuration at an installation location (e.g., a grocery store counter). For instance, it is noted that the exploded view of the data reading system 100 in FIG. 2 is shorter than the data reading system 100 of FIG. 1 and the platter 112 is illustrated without the optional rail 111 shown in FIG. 1. Other sizes and dimensions for the data reading system 100 or various other components may be used without departing from the principles of the disclosure.

Figure 3:
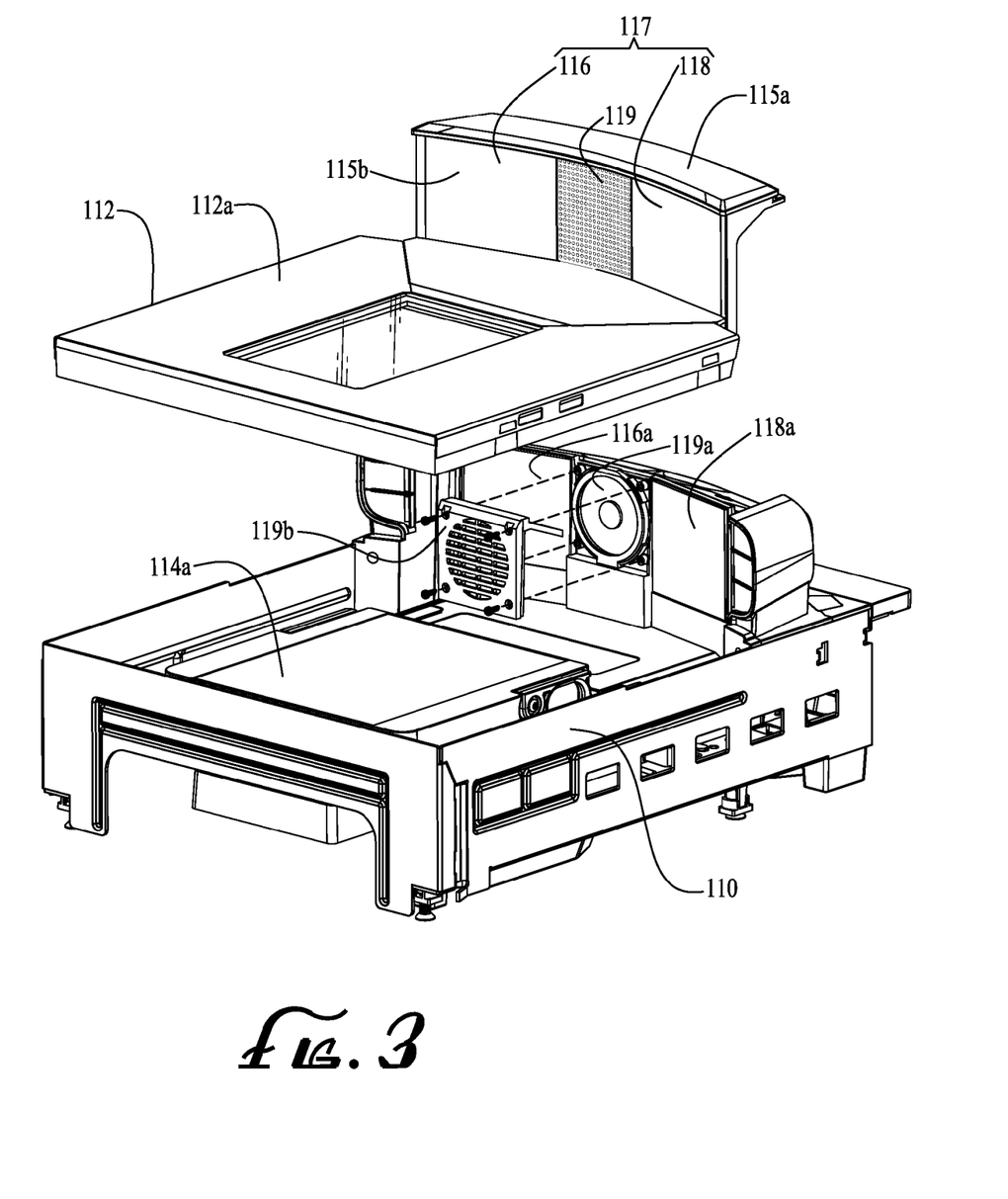
FIG. 3 is a partially exploded, isometric view of the data reader of FIG. 2, illustrating interior components of the data reader.

With reference to FIGS. 1-3, the data reading system 100 includes a lower base section 110 and an upper cover/platter 112, which, in some embodiments, may be a separate component and removable from the lower base section 110 (see FIG. 3). The platter 112 may include both a horizontal section 112a and a vertical upper section 115a which covers or forms a portion of the upper section 115 shown in FIG. 1. The platter may thus be in a dual-plane configuration comprising a weigh platter operable for weighing an item 20, such as the All-Weighs® platter available from Datalogic ADC, Inc. of Eugene, Oreg. or as described in U.S. Pat. No. RE 40,071, the disclosure of which is hereby incorporated by reference. When the platter 112 including both a horizontal section 112a and a vertical upper section 115a is installed in the data reading system 100, the horizontal platter section 112a may be considered as part of the lower base section 110, and the vertical upper section 115a may be considered as part of the upper section 115.

The horizontal section 112a includes a horizontal window 114 disposed thereon and made of a sufficiently transparent material (e.g., glass, acrylic glass, and the like) through which one or more data readers (not shown) may read optical codes on the item 20 as previously described. Details and example embodiments of a data reading system with a bottom data reader operable to read the bottom surface of an item are described in U.S. Pat. No. 8,430,318, as well as in U.S. application Ser. No. 13/740,150, filed Jan. 11, 2013, and U.S. App. No. 61/657,660, filed Jun. 8, 2012, the disclosures of which are hereby incorporated by reference.

Preferably, the window 114 is positioned in a substantially central region of the horizontal section 112a, or in other embodiments may be placed in any other portion of the horizontal section 112a, so that the item 20 travels over the window 114 as the item 20 is moved in the direction of motion 22. To help protect the window 114 from damage or chipping and to provide for a smooth passage of items over the window 114, the window 114 is preferably mounted flush with the surface of the horizontal section 112a.

In some embodiments, the horizontal section 112a may include a bump or raised section 111 for inhibiting items, such as spherical fruit and cylindrical cans, from rolling off the edge of the platter 112. The bump 111 may also provide a bearing surface for long items 20 to rest against during a weighing operation. For instance, depending on the length of the platter 112, some items 20 that need to be weighed may be longer than the length of the platter 112 (e.g., leeks, celery stalks, carrots, etc) such that one end of the item 20 is partially supported by platter section 115a during a weighing operation and the other end of the item 20 rests on the platter 112. In such instances, the bump 111 provides a bearing surface against which the end of the item 20 may bear to help prevent the item 20 from sliding off the platter 112. Additional details and features of the horizontal section 112a, such as a drain channel for diverting spills/debris or a depression for providing additional viewing angles for other data readers, are described in U.S. Pat. No. 8,430,318, the disclosure of which was previously incorporated by reference.

With particular reference to FIG. 3, the vertical upper section 115a is generally perpendicular to (e.g., forms a 90 degree angle) and extends upwardly from the horizontal section 112a to any desired height, such as a height ranging from one-half inch to five inches (1.27 cm to 12.70 cm) above the horizontal section 112a. In other embodiments, the vertical upper section 115a may be taller than the described range, such as having a height of between five to ten inches (12.7 cm to 25.4 cm) or more. Preferably, the vertical upper section 115a has a height dimension ranging from two to five inches (5.08 cm to 12.70 cm) so as to maintain a low profile and provide a streamlined design for the data reading system 100. A lower profile for the vertical upper section 115a also provides a user (e.g., the customer 40) with an unobstructed line-of-sight to the items 20 being processed.

Preferably, the vertical upper section 115a (and the upper section 115) extends across substantially (e.g., more than 90%) the width of the lower base section 110 and has a curved or arcuate profile. In other embodiments, the vertical upper section 115a (and the upper section 115) may have no curvature and instead comprise a substantially rectangular configuration. Preferably, however, the vertical upper section 115a includes an arcuate profile to help protect and shield the windows 116, 118 against impact damage from items 20 being moved across the platter 112. Additional details and advantages of the curved profile of the vertical upper section 115a are described below.

In some embodiments, the width of the vertical upper section 115a extends to a width that is at least greater than the width of the horizontal window 114 to provide a sufficient viewing angle (through each of the split windows 116, 118) for the imaging camera system to at least have an overlapping view volume with the bottom reader reading through the horizontal window 114. The overlapping view volumes help create a sweet spot for allowing the data reading system 100 to capture an optical code on the customer side surface 36 of the item 20 and on a top surface 26 of the item 20 for items 20 with a small height or vertical profile (using the split windows 116, 118), and also on the leading side 30, trailing side 32, and the bottom surface 28 of the item 20 (using the horizontal window 114).

With reference to FIG. 3, the vertical upper section 115a includes a split window 117 having a first window section 116 and a second window section 118 through which an imaging camera system (see FIG. 5) may read the customer side surface 34 (and sometimes the top surface 26) of the item 20. The vertical upper section 115a further includes a speaker grille 119 adjacent to one of the windows 116, 118, or positioned between the two windows 116, 118. Additional details relating to the speaker grille and speaker 119, 119a are described below.

The pair of window sections 116, 118 are positioned on a forward-facing, front face 115b (i.e., the surface that is orthogonal to the horizontal surface 112a and facing toward the horizontal window 114 or the second end 113b of the platter 112) and laterally spaced apart from each other. The window sections 116, 118 are preferably of substantially equal size in relation to one another and comprise a portion of the forward-facing surface 115b. In some embodiments, the window sections 116, 118 may have various sizes and dimensions depending on the configuration of the data reading system 100 and the upper section 115. For instance, in some embodiments, the window sections 116, 118 may have a width dimension measuring up to 150 mm and a height dimension measuring up to 100 mm. In other embodiments, the width may range from 70 mm to 90 mm and the height may range from 55 mm to 70 mm. In a preferred embodiment, the window sections 116, 118 each measure approximately 82 mm wide×64 mm tall with a clear aperture of 74 mm wide×59 mm tall. Additional details of the window sections 116, 118 and the imaging camera system and its components are detailed below with reference to FIGS. 6-8.

As briefly mentioned previously, the front face 115b includes an outer speaker grille 119 that is preferably positioned between the window sections 116, 118 and centered at a central portion (e.g. geometric midpoint) of the vertical upper section 115a. The speaker grille 119 protects the speaker 119a and allows sound generated from the speaker 119a to pass through so that the sound is audible to the user. The speaker 119a is configured for transmitting sounds, such as a beep sound notifying the customer 40 (or clerk 38) that the optical code on the item 20 was properly captured, or for transmitting other audible information, such as music, advertisements, announcements, or other communications. In some embodiments, the speaker 119a may also include an internal grille 119b to provide added protection to the internal components of the speaker 119a when the platter 112 with the outer speaker grille 119 is removed.

In one arrangement, the speaker grille 119 separates the window sections 116, 118 such that the speaker grille 119 is flanked on either side by the window sections 116, 118 on the front face 115b of the vertical upper section 115a. In some embodiments, the speaker grille 119 is approximately 55 mm wide×62 mm tall with 830 mm$^2$ of clear opening on the grille 119 for sound transmission. In other embodiments, the dimensions of the speaker grille 119 may vary depending on a variety of factors, such as the configuration and arrangement of the vertical upper section 115a (or upper section 115) and the window sections 116, 118. In some embodiments, the dimensions of the speaker grille 119 may range from between 40 to 75 mm in width and 45 to 80 mm in height. In other embodiments, the speaker grille 119 may have larger or smaller dimensions as desired.

The speaker grille 119 may be made of any suitable materials (e.g., acoustically transparent materials) to adequately protect the speaker 119a and promote desired sound quality. For instance, in some embodiments, the speaker grille 119 may be a soft grille made from any well-suited materials such as cloth, weaving, stitching, foam, and/or fabric. In general, soft grilles impose little resistance on the speaker driver because the material is free to move synchronously with the sound waves. Because the grille is capable of absorbing this vibration, soft grilles are generally less prone to rattling except at extremely high sound pressure levels. In other embodiments, the speaker grille 119 may be a hard grille made from metal, wood, and/or plastic (including thin, flexible plastics). Hard grilles do not typically move with the speaker's sound as freely as soft grilles, and generally include holes, slits, or other openings to allow sound to pass through.

While hard grilles tend to better protect the speaker, hard grilles are more prone to rattling as compared to soft grilles.

Preferably, the speaker grille 119 and the window sections 116, 118, comprise substantially the entire portion of the front face 115b, with the window sections 116, 118 being flush in relation to the speaker grille 119. In such a configuration, there is a smooth transition between the window sections 116, 118 and the speaker grille 119 on the front face 115b. With a flush configuration of these components, edges of the window sections 116, 118 are not exposed on the front face 115b, which may help protect the window sections 116, 118 from chipping or otherwise being damaged by items 20 being swept across the data reading system 100. In other embodiments, the windows sections 116, 118 may be recessed inwardly on front face 115b for additional protection from item impact.

In still other embodiments, the speaker grille 119 on the front face 115b may be replaced with other features or omitted altogether. For instance, the window sections 116, 118 may be separated by an opaque material, such as plastic, in place of the speaker grill 119. In such embodiments, the data reading system 100 may include messages, logos, instructions to the clerk 38 and/or customer 40, or other text/information. In other embodiments, the speaker grille 119 and the speaker 119a may instead be replaced by an electronic display, such as a touch screen display, or another communication device. In such embodiments, the electronic display may separate the two window sections 116, 118 and the display may be used to communicate with the customer 40 (or clerk 38). In yet other embodiments, the speaker grille/speaker combination 119, 119a may be replaced by a button panel (such as the button panel 120 described in detail below) having controls for operating various components of the data reading system 100. In still other embodiments, a different component or feature than those explicitly described herein may replace the speaker grille/speaker combination 119, 119a.

In yet other embodiments, the data reading system 100 may have only one window section (e.g., window section 116) and the speaker grille 119 may be adjacent to or laterally spaced apart from the window section 116 on front face 115b of upper section 115. For instance, data reading system 100 may be arranged as described previously, but the window section 118 may instead be replaced by a plastic panel (which may bear a logo, instructions for use or care, or other information) or by an electronic display (which may display messages or other information to the user).

As best illustrated in FIG. 2, the data reading system 100 may include a button panel 120 arranged on opposite ends of the upper section 115. The panel 120 may include a plurality of buttons 122 operable to control a variety of aspects of the data reading system 100. For example, in a preferred embodiment, the panel 120 includes a pair of three-button configurations on each of the opposite ends of the upper section 115 for a total of six buttons. In some embodiments, one three-button configuration may include a button 122 for a scale-zero function to zero out the weight of the weigh platter 112 to ensure an accurate weight of an item 20. Another button 122 may be for manual deactivation of an electronic article surveillance (EAS) system integrated with the data reading system 100. A third button 122 may be for overriding a detection system that monitors the edges of the weigh platter 112 to detect when an item is overhanging an edge of the weigh platter 112 during a weighing process.

In addition, the second three-button configuration may include a button 122 for controlling the volume (or other variable) of the speaker 119a. The other two buttons may be for controlling various features or aspects of the top-down reader 300. It should be understood that in other embodiments, the panel 120 may include buttons 122 for controlling other aspects of the data reading system 100 different than those explicitly described. In addition, the buttons 122 may be arranged in any suitable configuration as desired without departing from the principles of the disclosure.

The buttons 122 may be manufactured to snap fit into an opening on the panel 120 and may include a return spring mechanism to control movement of the buttons 122. In other embodiments, other suitable mechanisms and arrangements may be used for the buttons 122. Alternatively, the buttons 122 may be configured to operate using a capacitive proximity switch or other similar mechanism. An advantage of using capacitive proximity switches is that they would not require a cable connection from the base scanner to the weigh platter, which may affect the accuracy of the scale system and weigh platter 112 output.

As described previously, the data reading system 100 includes a split scan window 117 on the vertical upper section 115a with the window sections 116, 118 separated by the speaker grille 119. Preferably, the vertical upper section 115a has a curved contour centered around the speaker grille 119. In particular, the speaker grille 119 forms the center portion of the curve and the opposing ends of the upper section 115 (i.e., where the button panel 120 is located) form the end portions. In such an arrangement, the curvature of the upper section 115 and vertical upper section 115a may help protect the window sections 116, 118 by providing a barrier to deflect the item 20 in cases when the item 20 is swept too closely to the window sections 116, 118 during checkout.

For instance, during a typical checkout or item processing, the item 20 is moved from an initial position (such as off a conveyor) and swept across the platter 112 and over the scan window 114. In some instances, the item 20 may be swept in an arc motion across the platter 112 such that the item 20 may be close to the window sections 116, 118. The curvature of the upper section 115 may provide sufficient clearance so that the item 20 (moving in an arc-like motion) avoids contacting/impacting the window sections 116, 118. In addition, in some instances, the curvature at the ends (e.g., near the panels 120) provides a surface or shield upon which the item 20 may make contact instead of contacting, and potentially damaging, the window sections 116, 118. If the upper section 115 instead had a straight configuration, the window sections 116, 118 would be more exposed to the items 20 and would be more susceptible to impact damage.

In addition to helping protect the window sections 116, 118, the curved upper section 115 also provides a larger usable surface area of the platter 112 to allow for more room for larger items 20. In embodiments where the platter 112 is a weigh platter, the curvature of the upper section 115 may also help prevent a round item 20 from rolling off the platter 112 as it is being weighed. In other embodiments, the upper section 115 may have a different profile, such as an angular, multi-faceted, or other suitable shape, which may accomplish the same or similar function as the curved upper section 115.

In embodiments with a curved upper section 115, the speaker grille 119, and the window sections 116, 118 may each have curved contours to form the front face 115b of the curved upper section 115. Preferably, the speaker grille 119 has a curved surface, and the window sections 116, 118 comprise substantially planar slabs of transparent material, such as glass or plastic, that are positioned at an angle on the front face 115b (e.g., slanted toward one another) to create the generally curved contour of the upper section 115. Such a configuration may help reduce cost of the data reading system 100 since planar window sections tend to be less costly than curved sections. Moreover, planar window sections may introduce less optical distortion than curved sections, which may essentially function as a lens. One potential drawback is that the use of planar window sections 116, 118 may, in some instances, affect the smoothness of the curvature of the front face 115b, that is, the curvature may not be entirely smooth along the entirety of the front face 115b.

Figure 4:
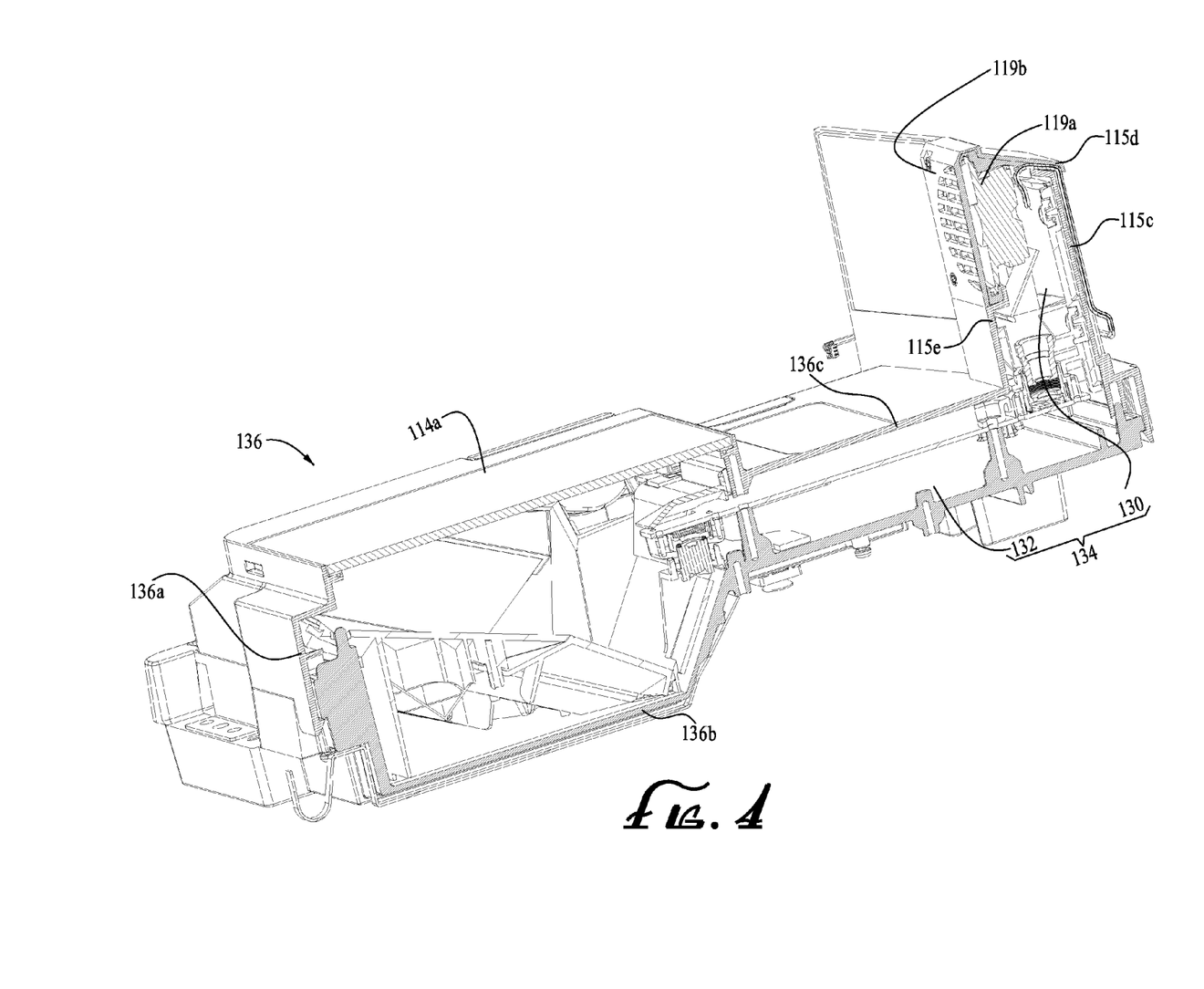
FIG. 4 is a cross-sectional view of an optics chassis of the data reader of FIG. 3 illustrating a speaker chamber.

FIG. 4 is a cross-sectional view of an optics chassis 136 (which is housed between the lower base section 110 and the platter 112) illustrating a speaker chamber 134 comprising an upper chamber or interstitial space 130 and a lower chamber or interstitial space 132. The upper chamber 130 is disposed within the upper section 115 and is generally bounded on a front end by an interior surface of a front wall 115e and the inner windows 116a, 118a, bounded on a rear end by an interior surface of a rear wall 115c, bounded on a top end by an interior surface of a top wall 115d, and bounded on a bottom end by an interior surface of a bottom wall 136b. Because the upper section 115 may include some components of the data reading system 100 (such as the speaker 119a, the imaging camera system, or other components), the upper chamber 130 may be characterized as comprising the interstitial space in the upper section 115, that is, the space in the upper section 115 free from any components or structures of the data reading system 100.

The lower chamber 132 is generally bounded by the interior surface of the perimeter walls of the optics chassis 136, including being bounded on a front end by an interior surface of a front wall 136a, bounded on a back end by the interior surface of the rear wall 115c, bounded on the bottom by an interior surface of a lower wall 136b, and bounded on top by an interior surface of the lower horizontal window 114a and a top wall 136c. In such embodiments, similar to the upper chamber 130, the lower chamber 132 may be characterized as comprising the interstitial space in the lower base section 110 free from any components or structures of the data reading system 100.

In some embodiments, one or both of the upper chamber 130 and the lower chamber 132 may include optical components, power supply/wiring, or other components of the data reading system 100, such as the optics cavity illustrated and described in U.S. Pat. No. 8,430,318, the disclosure of which was previously incorporated by reference. In other words, one or both of the upper chamber 130 and the lower chamber 132 may include part of, or comprise the entirety of, the optics cavity housing the optical components of the data reading system 100. In such an arrangement, the speaker chamber 134 comprises part of, or the entirety of, the optics cavity of the data reading system 100. One advantage of using the optics cavity is that it provides for a larger speaker chamber 134 without adding bulk to the system, while also maintaining a sealed environment to provide for better sound quality and sound pressure level output.

In other embodiments, one or both of the upper chamber 130 or the lower chamber 132 may be formed as a separate compartment free from any internal components of the data reading system 100. For instance, the lower chamber 132 may be free of any components and positioned beneath the illustrated optics chamber. However, such configurations may add to the bulk and weight of the data reading system 100 such that they may be less preferred.

As mentioned previously, the speaker chamber 134 is comprised of the upper and lower chambers 130, 132. As described with respect to FIG. 4, the upper and lower chambers 130, 132 are not physically distinct chambers. Rather, the chambers 130, 132 have overlapping regions where the upper chamber 130 transitions into the lower chamber 132 and vice versa. For instance, in the embodiment shown in FIG. 4, the chambers 130, 132 overlap at a corner region (lower right-hand side of the optical chassis 136) adjacent the lower wall 136b and the rear wall 115c. The speaker chamber 134 is essentially a continuous chamber formed by the combination of the upper and lower chambers 130, 132. By combining the upper and lower chambers 130, 132, the speaker chamber 134 has a much larger volume than prior data reading systems (where the speaker chamber was generally limited to a small cavity behind the speaker similar to or smaller than the upper chamber 130) and is thus better able to reproduce a broader range of frequencies at higher volume. In addition, such a configuration may provide acoustic advantages while using a smaller and/or lower power speaker 119a and yet still allow a low profile upper section 115.

In some embodiments, the upper section 115 measures between 65 mm to 75 mm in height. In other embodiments, the upper section 115 may have a greater height, such as up to 150 mm. In a preferred embodiment, the upper section 115 measures approximately 68 mm to 70 mm in height.

In such a configuration, a larger speaker chamber 134 helps provide a speaker 119a with a flatter frequency response curve (as compared to prior systems using a speaker with a smaller chamber and a Helmholtz resonator) to better reproduce sound across a relatively broad frequency range. In addition, with a flatter frequency response curve, the speaker 119a is better able to equally and accurately reproduce different sounds at a variety of frequencies, which provides a data reading system 100 with the ability to clearly and loudly emit different kinds of sounds at different frequencies (such as a beep indicating that the optical code was properly read). Such a configuration may be beneficial in retail store environments where there may be a number of data reading systems in close proximity to one another. For instance, if the data reading system 100 is capable of accurately reproducing a variety of distinct beeping sounds, the clerk 38 or customer 40 may more easily distinguish a beeping sound produced by the data reading system that the user is using from a different beeping sound produced by other nearby data reading systems. Such an arrangement would help ensure that all items are processed properly and would decrease the need to reprocess items.

In some embodiments, to help increase efficiency of the speaker 119a, the speaker chamber 134 may be mostly or entirely sealed to prevent sound waves being emitted from the back of the speaker diaphragm (known as back waves) from destructively interfering with sound waves being emitted from the front of the speaker diaphragm. Such destructive interference may result in a reduction of the overall sound pressure level and comb filtering. In other embodiments, the speaker chamber 134 may not need an airtight seal, such as in embodiments where the phase delay between front and back waves is large enough to not cause cancellation in frequencies of concern.

Figure 5:
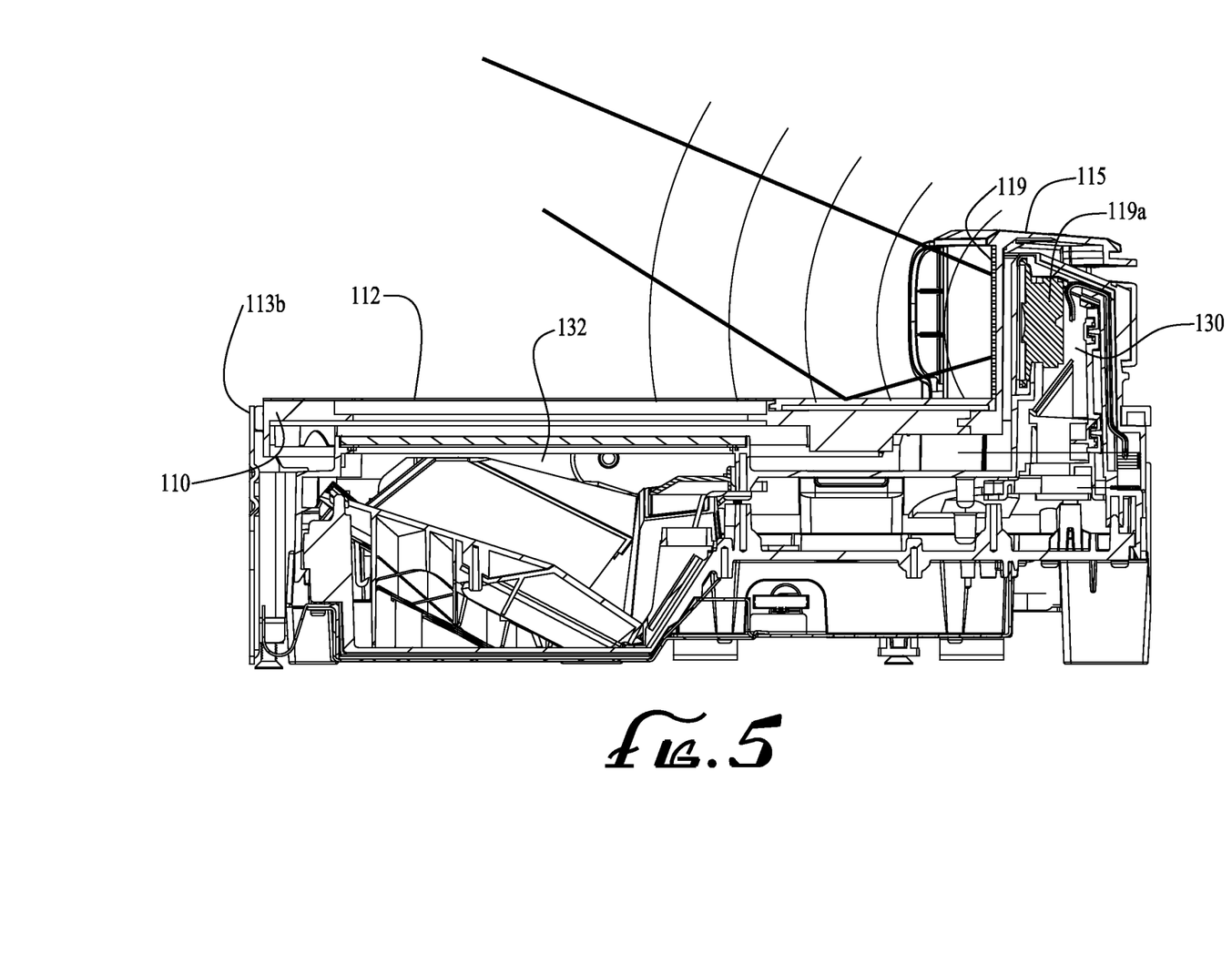
FIG. 5 is a cross-sectional view of the data reader of FIG. 2 illustrating example directional and reflection patterns of sound waves emitted from a speaker.

FIG. 5 illustrates examples of directional and reflection patterns of sound waves emitted by the speaker 119a according to one embodiment. During a typical scanning process using the data reading system 100, the user/operator (typically the checkout clerk 38 or the customer 40 in the case of a self-checkout system) stands at the second end 113b and is generally facing the upper section 115 and the speaker grille 119. Because the speaker 119a is centered on the front face 115b of the upper section 115 and in front of the user, the majority of the sound waves from the speaker 119a radiate forward directly toward the user. In addition, the sound waves radiating toward the left and right sides of the speaker 119a may be partially reflected toward the user by the curved ends of the upper section 115, and the sound waves radiating downward are also reflected toward the user by the platter 112. Accordingly, in the data reading system 100 configured as shown in the illustration, much of the sound emitted from the speaker 119a either travels directly toward the user or is otherwise reflected in the direction of the user.

Figure 6:
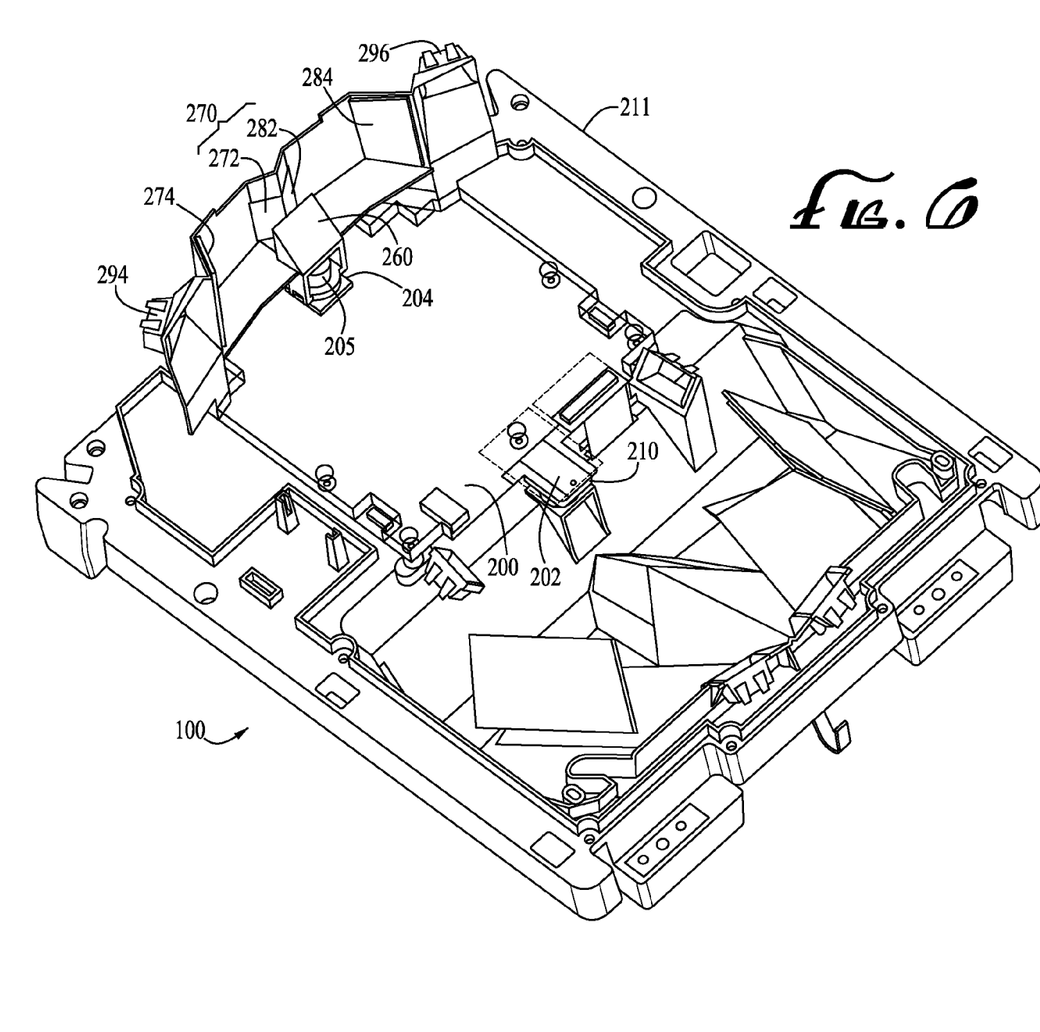
FIG. 6 is an isometric, plan view of internal mirror and optics arrangement of the data reader of FIGS. 1 and 2.

FIG. 6 is a diagrammatic view of the data reading system 100 with various upper elements removed to reveal internal imaging and illumination components as mounted on the lower chassis 211. The data reading system 100 includes a printed circuit board (PCB) 200 mounted on the lower chassis 211. The PCB 200 includes various components including microprocessor(s), imagers 204, 210, memory and other electronics. In this embodiment, the vertical imager 204 and the horizontal imager 210 are disposed on a common PCB 200, but separate PCBs may alternately be implemented.

The imaging and illumination components for the vertical section will now be described. As shown in FIG. 6, the PCB 200 includes an extended tab section 202 whereby the horizontal imager 210 is mounted on a bottom surface thereof, facing downwardly. Imaging and illumination components for the horizontal section, including the horizontal imager 210, are not described herein in detail. Additional details regarding example imaging and illumination components of the horizontal section are described in U.S. Pat. App. No. 61/657,660, the disclosure of which was previously incorporated by reference.

Figure 7:
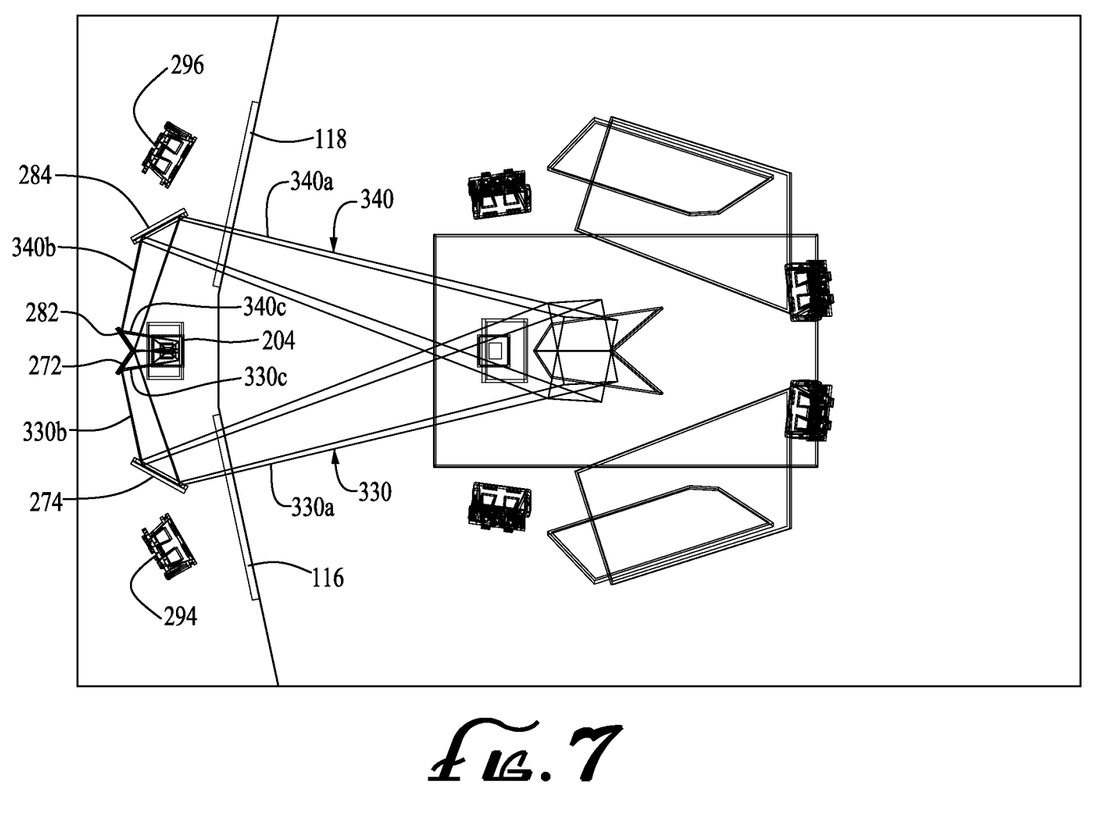
FIG. 7 is a diagrammatic top plan view of the data reader of FIGS. 1 and 2 showing imaging paths from the upper reader section.
Figure 8:
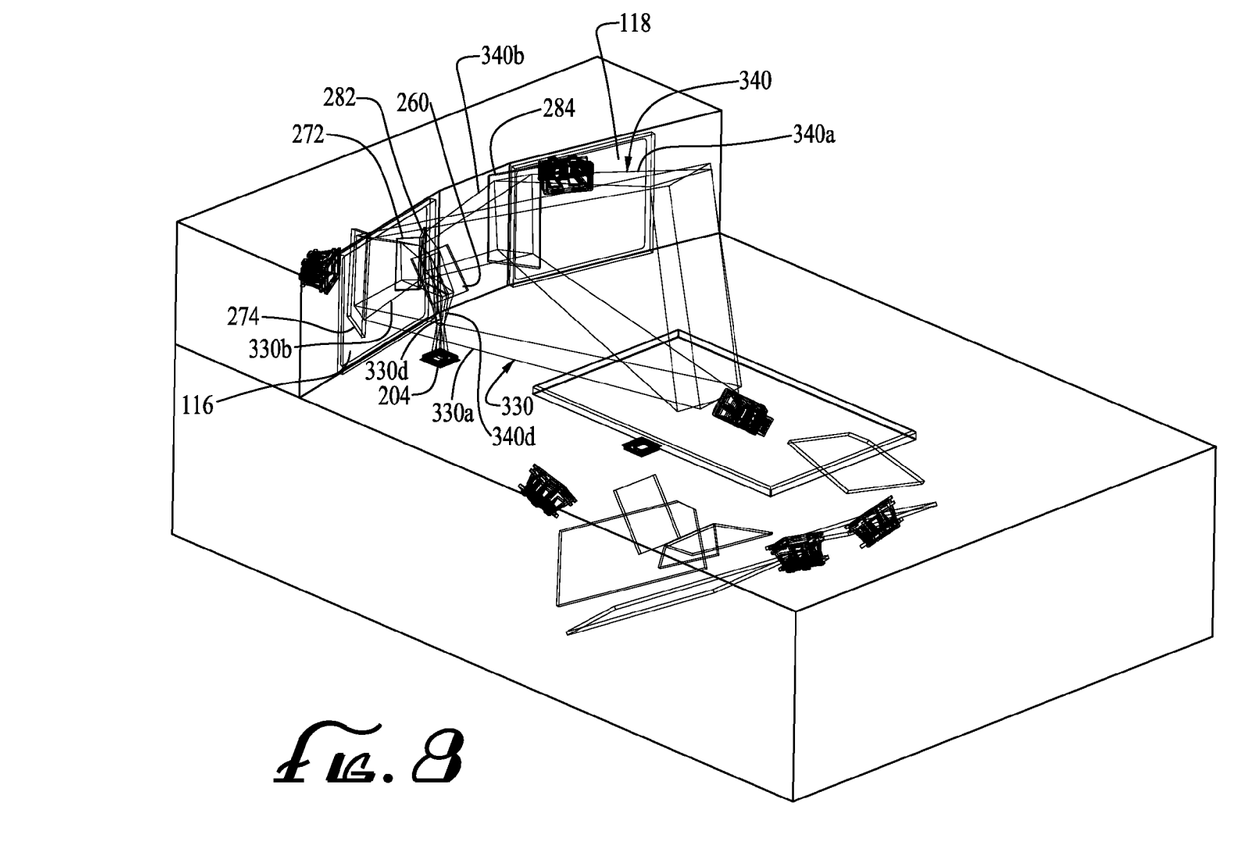
FIG. 8 is a diagrammatic isometric view of the data reader of FIGS. 1 and 2 showing imaging paths from the upper reader section.

As shown in FIGS. 6-8, the field of view 330 from the right side of the top imager 204 provides a view of the customer side 40 and the leading side 30 of the item 20 being passed through the view volume. The field of view 330 has a first view segment 330a passing in through the window 116 and then is redirected sidewardly by primary fold mirror 274, whereby a second view segment 330b passes to and is redirected forwardly (toward the checker 38) by secondary mirror 272 (which is the left side of split mirror 270), whereby third view segment 330c passes to and is redirected downwardly by tertiary mirror 260, whereby fourth view segment 330d (see FIG. 8) is focused by lens system 205 onto a right side region of the imager 204. It is noted that the view volumes shown in the figures are for illustrative purposes, and are not intended to represent either the near field or far field extent of the view volumes.

In similar fashion on the left side of the imager 204, the field of view 340 provides a view of the customer side 40 and the trailing side 32 of the item 20 being passed through the view volume. The field of view 340 has a first view segment 340a passing in through the window 118 and then is redirected sidewardly by primary fold mirror 284 whereby a second view segment 340b passes to and is redirected forwardly (toward the checker 38) by secondary mirror 282 (which is the right side of split mirror 270), whereby third view segment 340c passes to and is redirected downwardly by tertiary mirror 260 whereby fourth view segment 340d (see FIG. 8) is focused by lens system 205, where the image crosses over onto a left side region of the imager 204.

The imager 204 may comprise two separate imagers (mounted, for example, on a common printed circuit board), one for each field of view 330, 340 or the imager may comprise a single component with a single imaging area wherein different fields of view can be imaged onto separate regions of the imaging area. One such suitable imager is the model EV76C560 1.3 MP CMOS image sensor available from e2V of Essex, England and Saint-Egréve, France. Further embodiments and details for such multiple view systems may be found in U.S. Pat. No. 8,261,990 and U.S. patent application Ser. No. 12/646,829, filed Dec. 23, 2009, the disclosures of which are hereby incorporated by reference.

It should be understood that other arrangements with more or fewer mirrors, or other additional optical components, may be possible. For instance, in one arrangement, the tertiary mirror 260 may be omitted and the imager 204 may be repositioned so that the view segments 330c, 340c reflecting off the secondary mirrors 272, 282 may be directly focused (as opposed to first reflecting off the tertiary mirror 260) by lens system 205 onto the imager 204. Other arrangements may be possible and may be accomplished by repositioning one or more optical components of the imaging camera system to provide a desired optical path.

Depending on the layout of the data reading system 100, the environment or the store/checkout stand arrangement, ambient lighting may be sufficient to provide adequate illumination for the imagers 204, 210. In some embodiments, however, additional light sources may be added, such as a row or array of LEDs (Light Emitting Diodes) mounted in/on the upper section 115 and a row/array of LEDs mounted in/on the lower housing base section 110 pointed into the view volume and positioned to illuminate an item 20 with respect to one or more perspectives. The LEDs may also be disposed internally behind windows 116, 118. In other embodiments, any suitable number of LED arrays or other suitable light sources may be employed.

Although the description above contains much specificity, these details should not be construed as limiting the scope of the invention, but as merely providing illustrations of some embodiments of the invention. It is intended that subject matter disclosed in any portion herein can be combined with the subject matter of one or more of other portions herein as long as such combinations are not mutually exclusive or inoperable.

The terms and descriptions used above are set forth by way of illustration only and are not meant as limitations. Thus, while certain embodiments and example applications have been shown and described, it will be apparent to those having skill in the art that many changes may be made to the details of the above-described embodiments without departing from the underlying principles of the invention. The scope of the invention should, therefore, be determined only by the following claims.

The invention claimed is:

1. A data reading system for reading encoded data on an item, the data reading system comprising:
    a lower base section having a first end, an opposite second end, and a central region positioned between the first and second ends;
    a vertical section arranged adjacent the first end of the lower base section, the vertical section extending upwardly from the lower base section and including a front face oriented toward the second end of the lower base section;
    a scan window having a first window section and a second window section spaced apart from each other, wherein the data reading system is configured to capture the encoded data on the item through one or both of the first and second window sections; and
    a speaker system including a speaker grille, the speaker grille positioned on the front face of the vertical section between the first window section and the second window section of the scan window.

2. The data reading system of claim 1, wherein the front face of the vertical section comprises a curved contour.

3. The data reading system of claim 1, wherein the first and second window sections extend to the lower base section.

4. The data reading system of claim 1, wherein the first and second window sections and the speaker grille comprise substantially the entire portion of the front face of the vertical section.

5. The data reading system of claim 1, wherein the first and second window sections are horizontally spaced apart from each other across the front face of the vertical section.

6. The data reading system of claim 2, wherein the first and second window sections each have a substantially planar outward face.

7. The data reading system of claim 6, wherein the first and second window sections are angled relative to each other on the front face of the vertical section.

8. A data reading system for reading encoded data on an item, the data reading system comprising:
 a lower base section having a top surface, an opposite bottom wall, and a first interstitial space bounded between the top surface and the bottom wall, the top surface having a first end and an opposite second end;
 a vertical section arranged adjacent the first end of the top surface and extending upwardly from the lower base section, the vertical section including:
  a front face oriented laterally over the top surface of the lower base section and facing the second end of the lower base section,
  an opposite back wall facing the first end of the lower base section, and
  a second interstitial space defined between the front face and the back wall of the vertical section; and
 a speaker system having a speaker and a speaker grille, wherein the speaker grille is positioned on the front face of the vertical section, and wherein the first and second interstitial spaces define a continuous speaker chamber constructed and arranged for amplifying the sound of the speaker.

9. The data reading system of claim 8, wherein the front face of the vertical section further includes a scan window through which a data reader is configured to read the encoded data on the item.

10. The data reading system of claim 9, wherein the front face includes a second scan window separate from and laterally spaced apart from the first scan window, wherein the data reader is further operable to view through the second scan window to capture the encoded data on the item.

11. The data reading system of claim 8, further comprising an optical chassis housed between the top surface and the bottom wall of the lower base section, wherein the first interstitial space is bounded within the optical chassis.

12. A data reading system for reading encoded data on an item, the data reading system comprising:
 a lower base section having a first end, an opposite second end, and a central region positioned between the first and second ends;
 a vertical section arranged adjacent the first end of the lower base section, the vertical section extending upwardly from the lower base section and including a front face facing the second end of the lower base section, the front face including a first scan window section and a second scan window section through which a data reader is configured to read the encoded data on the item; and
 a panel positioned on the front face of the vertical section between the first and second scan window sections.

13. The data reading system of claim 12, wherein the panel includes an electronic display for displaying electronic information.

14. The data reading system of claim 12, wherein the panel further includes controls to operate features of the data reading system.

15. The data reading system of claim 12, wherein the first and second window sections are angled relative to each other on the front face of the vertical section.

16. The data reading system of claim 12, wherein the first and second window sections extend to the lower base section.

17. The data reading system of claim 12, wherein the first and second window sections and the panel comprise substantially the entire portion of the front face of the vertical section.

18. The data reading system of claim 12, wherein the first and second window sections are horizontally spaced apart from each other across the front face of the vertical section.

* * * * *